United States Patent [19]

Hudson et al.

[11] Patent Number: 4,796,701

[45] Date of Patent: Jan. 10, 1989

[54] PYROLYTIC CARBON COATING OF MEDIA IMPROVES GRAVEL PACKING AND FRACTURING CAPABILITIES

[75] Inventors: Tommy E. Hudson, Skiatook; James W. Martin, Broken Arrow, both of Okla.

[73] Assignee: Dowell Schlumberger Incorporated, Tulsa, Okla.

[21] Appl. No.: 79,728

[22] Filed: Jul. 30, 1987

[51] Int. Cl.$^4$ ...................... E21B 43/04; E21B 43/267
[52] U.S. Cl. .................................... 166/278; 166/280; 428/403
[58] Field of Search ....................... 166/276, 278, 280; 428/403, 404

[56] References Cited

U.S. PATENT DOCUMENTS

| | | | |
|---|---|---|---|
| 3,237,693 | 3/1966 | Huitt et al. | 166/280 |
| 3,481,401 | 12/1969 | Graham | 166/280 |
| 3,497,008 | 2/1970 | Graham et al. | 166/280 |
| 3,664,420 | 5/1972 | Graham et al. | 166/280 |
| 3,945,884 | 3/1976 | Freck | 376/411 |
| 4,632,876 | 12/1986 | Laird et al. | 428/403 X |
| 4,654,266 | 3/1987 | Kachnik | 166/280 X |
| 4,705,108 | 11/1987 | Little et al. | 166/280 X |

*Primary Examiner*—George A. Suchfield
*Attorney, Agent, or Firm*—Stephen A. Littlefield

[57] ABSTRACT

A pyrolytic carbon coated particle for use in well fracturing and sand control applications comprising: a thermally stable substantially spherical substrate particle (e.g., ceramic composite bead or the like) and a substantially uniform layer of pyrolytically deposited carbon encapsulating said thermally stable substantially spherical substrate particle. Such carbon coated particles exhibit physical properties superior to materials commonly used in gravel pack and well fracturing operations as well as improved chemical resistance to acids, organics and steam.

12 Claims, No Drawings

PYROLYTIC CARBON COATING OF MEDIA IMPROVES GRAVEL PACKING AND FRACTURING CAPABILITIES

BACKGROUND OF THE INVENTION

1. Field of the Invention

This invention relates to pyrolytic carbon coated particles and their use in sand control and fracturing. More specifically, but not by way of limitation, the invention relates to pyrolytic carbon coated ceramic beads.

2. Description of the Prior Art

The techniques for placing particulate material in a well, such as oil, gas and water wells, has been known for many years. In such techniques particulate material is placed in the wellbore and the formation. The particle size range of the particulate material is preselected, and is introduced into the well in such a manner that the packed material will allow the flow of the desired fluid (the term being used to include liquids and/or gases) between the formation and the wellbore, while preventing particulate materials from the earth formation from entering the wellbore.

In gravel pack applications, the objective is to pack a well with a given particulate. Typically a screen is first placed at a position in the wellbore which is within the formation which will produce the desired fluid. In completed wells, a perforated steel casing is usually present between the so placed screen and formation. A slurry of the particulate material in a carrier liquid is then pumped into the wellbore so as to place the particulate material between the screen and casing (or formation if no casing is present), as well as into the perforations of any such casing, and also into any open area which may extend beyond the perforated casing into the formation. Thus, the aim in packing, in most cases, is to completely fill the area between the screen assembly and the formation with particulate material. In some cases this open area is packed with particulate material before placing the screen in the well. Such a technique, which is a particular type of packing often referred to as 'prepacking', is described in U.S. Pat. No. 3,327,783. The particulate material is typically gravel having a density of 2.65 gm/cc. The carrier fluid is usually water with 2% KCl but can be any type of fluid (hydrocarbons, brines, foams, etc). This fluid is commonly viscosified with a polymer to enhance carrier capacity.

In fracturing techniques, the formation is broken down by the application of pressure. While holding open the fissures in the rocks, particulate material is placed in the formation to maintain a more permeable path of flow for the produced fluid. The carrier fluid is the same type as that used in gravel pack applications but its viscosity is of a magnitude greater than that used for gravel pack applications. The fracturing fluid is often crosslinked to achieve the desired viscosity for adequate suspension properties in lengthy flow channels.

In recent applications it has been recognized that providing a particulate material that exhibits improved thermal stability and chemical resistance particularly to mineral acids, organic solvents and steam would be desirable. Additionally, to simultaneously control both the selection of particle density and size distribution would be advantageous, particularly in certain contemporary applications. The present invention is felt to provide such a particulate phase.

SUMMARY OF THE INVENTION

The present invention provides a coated particle whose chemical resistance and physical properties are superior to materials commonly used in oil and gas well gravel pack and fracturing operations.

The particle has a pyrolytic carbon layer coating encapsulating the particle thus providing an inert barrier, resistant to both acids and organic solvents. The pyrolytic carbon coated particle exhibits improved thermal stability relative to conventional products and as such is useful in geothermal well applications. Thus the present invention provides a pyrolytic carbon coated particle useful in well treatment applications comprising:

(a) a thermally stable substantially spherical substrate particle; and (b) a substantially uniform layer of pyrolytically deposited carbon encapsulating said thermally stable substantially spherical substrate particle.

In one preferred embodiment of the present invention, the spherical substrate particulate material is a ceramic composite bead encapsulated with a pyrolytic carbon having a density range of from about 1.50 to about 2.05 gm/cc and a thickness of about 5$\mu$ to about 200$\mu$.

It is an object of the present invention to provide a pyrolytic carbon coated particle useful in oil and gas well treatment applications. It i a further object to provide such a coated particle that exhibits improved resistance to both acids and organic solvents. Fulfillment of these objects and the presence and fulfillment of other objects will be apparent on complete reading of the specification and claims.

DESCRIPTION OF THE PREFERRED EMBODIMENTS

The particle to be pyrolytically coated according to the present invention can generally be any gravel or sand particle conventionally employed in oil and gas well gravel packs and/or fracturing applications or equivalent material such as ceramic composite beads. Thus, broadly, any essentially spherical particle exhibiting the physical properties necessary for downhole applications and capable of being pyrolytically coated with carbon can be advantageously coated according to the present invention. Typically the particle substrate will be a relatively inert medium which can withstand the temperatures encountered during pyrolytic carbon deposition. This would include by way of example but not limited thereto; sand, ceramic beads, ceramic coated composites, high strength glass beads, petroleum coke and the like. Preferably the particle to be coated is a ceramic coated composite such as disclosed in U.S. Pat. No. 4,632,876.

Typically for gravel pack well treatment applications, acceptable physical properties for the particulate sand phase include: average specific gravity of 2.65 g/cc ±0.1 maximum (ASTM D792); Krumbein roundness of 0.6 minimum (API RP58, sec.5); Krumbein sphericity of 0.6 minimum (API RP58, sec.5); mud acid solubility at 150° F. for 1 hour of 1.0 weight % maximum (API RP58, sec.6); and crush resistance after 2 minutes @ 2000 psi of a maximum of 8% fines for 8/16 mesh, 4% fines for 12/20 mesh and 2% fines for 16/30, 20/40, 30/50 and 40/60 mesh. The coated particle according to the present invention can be selected to meet or exceed these physical properties with the added advantages of greater chemical stability and selectivity of particle density.

The method of coating the particle according to the present invention is categorically a high temperature pyrolysis. As such the particle to be coated is brought into contact with a hydrocarbon, typically in the presence of an inert diluent at elevated temperatures for sufficient time that a uniform layer of carbon is deposited on the external surface of the particle. Preferably the entire particle is encapsulated producing a spherical medium with a pyrolytic carbon coating. In principle the encapsulation process can be accomplished by any conventional pyrolytic method as generally known in the art including by way of example but not limited thereto; dip spinning, spray coating, fluid bed or the like.

Typically the carbon coating process consists of using a vertical tube, the bottom end of which gradually reduces in cross section until only a small orifice is left. During deposition of the carbon on the particulate substrate, gas flowing up through the tube is maintained at a flow rate sufficient to suspend the particles; i.e., fluidized bed. Preferably the temperature of the carbon deposition occurs best between 1000° C. and 1700° C. At these temperatures the carbon molecules fuse to form a cystalline structure on the outside surface of the particle. Typically the gas flow involves a gaseous hydrocarbon and an inert gas diluent; for example and preferably, the gas flow into the tube is a mixture of propylene, acetylene or the like, and helium at a flow rate of 10 liters per minute. The tube is heated inductively to achieve the desired temperature in the suspended bed of particles.

The orientation of the pyrolytic carbon coating varies with the deposition rate and temperature. At a deposition rate of 0.5 $\mu$ of carbon per minute, the carbon deposits in a laminar orientation which is preferred. At a deposition rate of about 2 $\mu$/ minute the carbon deposits anisotropically. In the preferred laminar orientation, the pyrolytically deposited carbon layer is essentially impermeable. The rate of carbon deposition and the density of the coating varies with temperature. Preferably the deposition takes place at a temperature below 1700° C. At such temperatures, carbon layer density will vary from about 1.50 to about 2.05 gm/cc. Typically the thickness of the pyrolytic coating can range from about 5$\mu$ to about 200$\mu$ and preferably from about 10$\mu$ to 150$\mu$.

The following example illustrates the pyrolytic carbon coated particles according to the present invention and their improved properties.

EXAMPLE I

In a manner as described above, 100 gm of a ceramic bead, 30–50 mesh, were pyrolytically coated with carbon by G. A. Technology, Inc. The individual sand grains were entirely encapsulated with approximately a 50$\mu$ uniform layer of carbon resulting in essentially a spherical medium. The solubility of the pyrolytic carbon coated medium in a 12 to 3 weight mixture of HCl and HF was tested at two different temperatures. The weight loss after one hour was recorded and compared to the corresponding weight loss for sand without the carbon coating. The resulting data are presented in the following Table I.

TABLE I

| Percent Change in Weight After One Hour in 12:3 HCl:HF | | |
|---|---|---|
| Sample | Temperature (°F.) | Percent Change |
| Ceramic Bead | 150 | −1.6 |
| Ceramic Bead | 250 | −3.6 |
| PyroCarbon Ceramic Bead-50u | 150 | 0 |
| PyroCarbon Ceramic Bead-50u | 250 | 0 |

Clearly the data suggest that the pyrolytic coating of carbon is protecting the sand substrate from acid attack.

EXAMPLE II

A series of precoated $ZrO_2$ particles supplied by G. A. Technology, Inc., and ceramic composite spheroids manufactured by 3M, sold under the tradename MACROLITE, characterized by densities ranging from about 0.58 to 2.04, coated pyrolytically with a uniform layer of carbon by G. A. Technology, Inc., were tested in a manner analogous to Example I. During the pyrolysis coating process a mixture of acetylene and/or propylene and helium at a flow rate of 10 l/min was employed at a temperature below 1700° C. The thickness of the coatings of the MACROLITE samples varied from about 5$\mu$ to 130 ||. Both the chemical and the physical properties of the resulting coated ceramic particles were measured and compared to uncoated particles. The chemical properties of the pyrolytic coated ceramics included solubility in 15% HCl, a 12 to 3 mixture of HCl and HF, toluene and kerosene, while the physical properties included particle density, sieve analysis, crush strength and conductivity. The resulting data are presented in the following Tables.

TABLE II

| SOLUBILITY TESTING OF PYROLYTIC CARBON MATERIAL (150° F., 1 HOUR & 7 DAYS) | | | | | |
|---|---|---|---|---|---|
| | Percent Weight Loss in Solvent | | | | |
| Material/Time | HCl | HCl:HF | Toluene | Kerosene | Crude Oil |
| $ZrO_2$-core/1 hr | −0.08 | −4.48 | +0.09 | +0.22 | +0.20 |
| $ZrO_2$-pyrocarb/1 hr | 0.00 | +0.04 | +0.08 | 0.00 | +0.04 |
| $ZrO_2$-pyrocarb/7 day | — | — | 0.00 | 0.00 | 0.00 |

TABLE III

| RESISTANCE OF ENCAPSULATED MACROLITE TO 12:3 HCl:HF (150° F., 1 HOUR) | | |
|---|---|---|
| Particle Material/Density | Coating Thickness | Percent Weight Change |
| MACROLITE(1.03) | none | −100.0 |
| MACROLITE(1.50) | none | −52.41 |
| MACROLITE(1.66) | none | −13.77 |
| MACROLITE(2.04) | none | −20.07 |
| MACROLITE(1.03) | 5$\mu$ | +1.56 |
| MACROLITE(1.03) | 10$\mu$ | +3.11 |
| MACROLITE(1.03) | 50$\mu$ | +0.01 |
| MACROLITE(1.50) | 10$\mu$ | 0.00 |

TABLE IV

| RESISTANCE OF ENCAPSULATED MACROLITE TO 15% HCl (150° F., 1 HOUR) | | |
|---|---|---|
| Particle Material/Density | Coating Thickness | Percent Weight Change |
| MACROLITE(0.58) | none | −1.26 |
| MACROLITE(1.03) | none | −1.14 |

TABLE IV-continued
RESISTANCE OF ENCAPSULATED MACROLITE TO 15% HCl (150° F., 1 HOUR)

| Particle Material/Density | Coating Thickness | Percent Weight Change |
|---|---|---|
| MACROLITE(1.50) | none | −1.40 |
| MACROLITE(1.66) | none | −0.76 |
| MACROLITE(1.03) | 5μ | +1.26 |
| MACROLITE(1.03) | 10μ | +1.81 |
| MACROLITE(1.03) | 50μ | +0.08 |
| MACROLITE(1.50) | 10μ | +0.04 |

TABLE V
RESISTANCE OF ENCAPSULATED MACROLITE TO TOLUENE (150° F., 1 HOUR)

| Particle Material/Density | Coating Thickness | Percent Weight Change |
|---|---|---|
| MACROLITE(0.58) | none | 0.00 |
| MACROLITE(1.03) | none | 0.00 |
| MACROLITE(1.50) | none | 0.00 |
| MACROLITE(1.66) | none | 0.00 |
| MACROLITE(2.04) | none | 0.00 |
| MACROLITE(1.03) | 5μ | −0.01 |
| MACROLITE(1.03) | 10μ | −0.08 |
| MACROLITE(1.03) | 50μ | 0.00 |
| MACROLITE(1.50) | 10μ | 0.00 |

TABLE VI
RESISTANCE OF ENCAPSULATED MACROLITE TO KEROSENE (150° F., 1 HOUR)

| Particle Material/Density | Coating Thickness | Percent Weight Change |
|---|---|---|
| MACROLITE(1.03) | none | 0.00 |
| MACROLITE(1.50) | none | 0.00 |
| MACROLITE(1.66) | none | 0.00 |
| MACROLITE(2.04 | none | 0.00 |
| MACROLITE(1.03) | 10μ | −0.04 |
| MACROLITE(1.03) | 50μ | +0.02 |
| MACROLITE(1.50) | 10μ | 0.00 |

TABLE VII
RESISTANCE OF ENCAPSULATED MACROLITE TO CRUDE OIL (150° F., 1 HOUR)

| Particle Material/Density | Coating Thickness | Percent Weight Change |
|---|---|---|
| MACROLITE(1.03) | none | 0.00 |
| MACROLITE(1.50) | none | 0.00 |
| MACROLITE(1.66) | none | 0.00 |
| MACROLITE(2.04 | none | 0.00 |
| MACROLITE(1.03) | 10μ | −0.04 |
| MACROLITE(1.03) | 50μ | 0.00 |
| MACROLITE(1.50) | 10μ | −0.06 |

TABLE VIII
CRUSH RESISTANCE (2000 psi for 2 minutes in a 2 inch cell)

| Particle Material/Density | Coating Description | Strength (% Crush) |
|---|---|---|
| Gravel(2.65) | none | 0.1 |
| ZrO$_2$(5.61) | none | 0.0 |
| ZrO$_2$(2.42) | pyrocarbon | 0.0 |
| MACROLITE(1.03) | none | 74.00 |
| MACROLITE(1.50) | none | 16.4 |
| MACROLITE(1.03) | 10μ | 40.1 |
| MACROLITE(1.50) | 10μ | 18.9 |
| MACROLITE(1.50) | 50μ | 25.6 |
| MACROLITE(1.50) | 130μ | 0.4 |

TABLE IX
RESISTANCE OF ENCAPSULATED MACROLITE TO CRUDE OIL (30 days, 150° F., 3000 psi)

| Particle Material/Density | Coating Thickness | Percent Weight Change |
|---|---|---|
| MACROLITE(1.03) | 10μ | −0.05 |
| MACROLITE(1.50) | 50μ | 0.00 |

Having thus described the invention with a certain degree of particularity, it is to be understood that the invention is not limited to the embodiments set forth herein for purposes of exemplification, but is to be limited only by the scope of the attached claims, including a full range of equivalents to which each element thereof is entitled.

We claim:

1. A method for placement of particles in a well comprising the steps of:
   (a) providing pyrolytic carbon coated particles comprised of a thermally stable substantially spherical substrate particles and a substantially uniform layer of pyrolytically deposited carbon encapsulating each of said thermally stable substantially spherical substrate particles;
   (b) suspending said prolytic carbon coated particles in a fluid; and
   (c) pumping said fluid with suspended pyrolytic carbon coated particles into a well.

2. A method of claim 1 wherein said thermally stable substantially spherical substrate particle is a ceramic composite bead.

3. A method of claim 1 wherein said layer of pyrolytically deposited carbon has a density range of from about 1.50 to about 2.05 gm/cc.

4. A method of claim 2 wherein said layer of pyrolytically deposited carbon has a density range of from about 1.50 to about 2.05 gm/cc.

5. A method of claim 1 wherein said layer of pyrolytically deposited carbon is a layer of substantially laminar oriented carbon deposit.

6. A method of claim 2 wherein said layer of pyrolytically deposited carbon is a layer of substantially laminar oriented carbon deposit.

7. A method of claim 1 wherein said carbon layer ranges from about 5μ to about 200μ thick.

8. A method of claim 2 wherein said carbon layer ranges from about 5μ to about 200μ thick.

9. A method of claim 3 wherein said carbon layer ranges from about 5μ to about 200μ thick.

10. A method of claim 4 wherein said carbon layer ranges from about 8μ to about 200μ thick.

11. A method of claim 5 wherein said carbon layer ranges from about 5μ to about 200μ thick.

12. A method of claim 6 wherein said carbon layer ranges from about 5μ to about 200μ thick.

* * * * *